United States Patent
Shao et al.

(10) Patent No.: US 11,780,936 B2
(45) Date of Patent: Oct. 10, 2023

(54) METHOD FOR EXTRACTING AND PURIFYING DENDROBIUM OFFICINALE POLYSACCHARIDES

(71) Applicant: Zhejiang University of Technology, Zhejiang (CN)

(72) Inventors: Ping Shao, Zhejiang (CN); Peiyu Qian, Zhejiang (CN); Jiefeng Pan, Zhejiang (CN); Peilong Sun, Zhejiang (CN)

(73) Assignee: Zhejiang University of Technology, Hangzhou (CN)

( * ) Notice: Subject to any disclaimer, the term of this patent is extended or adjusted under 35 U.S.C. 154(b) by 608 days.

(21) Appl. No.: 17/010,808

(22) Filed: Sep. 2, 2020

(65) Prior Publication Data
US 2021/0332157 A1    Oct. 28, 2021

(30) Foreign Application Priority Data

Apr. 25, 2020   (CN) .......................... 202010336013.1

(51) Int. Cl.
| | | |
|---|---|---|
| *C08B 37/00* | (2006.01) | |
| *B01D 61/14* | (2006.01) | |
| *B01D 61/42* | (2006.01) | |
| *B01D 61/58* | (2006.01) | |
| *B01D 69/02* | (2006.01) | |

(52) U.S. Cl.
CPC ........ *C08B 37/0003* (2013.01); *B01D 61/145* (2013.01); *B01D 61/146* (2022.08); *B01D 61/147* (2013.01); *B01D 61/422* (2013.01); *B01D 61/58* (2013.01); *B01D 69/02* (2013.01); *B01D 2311/12* (2013.01); *B01D 2317/025* (2013.01); *B01D 2325/20* (2013.01)

(58) Field of Classification Search
CPC .. B01D 61/145; B01D 61/146; B01D 61/147; B01D 61/422; B01D 61/58; B01D 69/02; B01D 2311/12; B01D 2317/025; B01D 2325/20; C08B 37/0003
See application file for complete search history.

(56) References Cited

U.S. PATENT DOCUMENTS

| | | | |
|---|---|---|---|
| 6,372,049 B1 | 4/2002 | Shimanskaya et al. | |
| 8,097,086 B2 | 1/2012 | Apoujade et al. | |

FOREIGN PATENT DOCUMENTS

| | | | | |
|---|---|---|---|---|
| CN | 102532332 A | | 7/2012 | |
| CN | 106317243 A | * | 1/2017 | |
| CN | 106317243 A | | 1/2017 | |
| CN | 107376404 A | * | 11/2017 | |

OTHER PUBLICATIONS

English-language machine translation of CN 107376404A (Year: 2018).*
Xie, Jian-Hua et al., Separation of water-soluble polysaccharides from Cyclocarya paliurus by ultrafiltration process, Carbohydrate Polymers 101, 2014, pp. 479-483.
Zhu, Jiangxiong et al., Comparison and structural characterization of polysaccharides from natural and artificial Se-enriched green tea, International Journal of Biological Macromolecules 130, 2019, pp. 388-398.

* cited by examiner

Primary Examiner — James C Goloboy

(57) ABSTRACT

A method for extracting and purifying *Dendrobium officinale* polysaccharides comprises following steps: (1) fully disperse *Dendrobium officinale* powder in pure water to obtain crude liquid; (2) removing insoluble impurities from the crude liquid through a microfiltration membrane to obtain permeate 1 and retentate 1; (3) performing macroporous ultrafiltration treatment of the permeate 1 and collect permeate 2 and retentate 2; (4) adding an aqueous solution of edible alkali metal inorganic salt to the retentate 2, fully stirring and dissolving to obtain polysaccharide crude liquid, performing macroporous ultrafiltration treatment and collecting permeate 3 and retentate 3; (5) combining the permeate 2 and permeate 3, adding the combined permeate into an electrodialysis device for desalination, and collecting dilute solution and concentrated solution; (6) performing microporous ultrafiltration treatment of the dilute solution and collect retentate 4 and permeate 4; (7) carrying out freeze-drying of the retentate 4 to obtain *Dendrobium officinale* polysaccharides.

13 Claims, 5 Drawing Sheets

US 11,780,936 B2

METHOD FOR EXTRACTING AND PURIFYING DENDROBIUM OFFICINALE POLYSACCHARIDES

CROSS-REFERENCE TO RELATED APPLICATIONS

This application claims the benefit of Chinese Patent Application No. 202010336013.1, filed on Apr. 25, 2020, the contents of which are incorporated herein by reference in their entireties.

FIELD OF THE INVENTION

The present invention relates to a general technical field of extraction and purification of natural polysaccharides, especially relates to a method for extracting and purifying *Dendrobium officinale* polysaccharides.

BACKGROUND OF THE INVENTION

*Dendrobium* has been used in the medicinal health care in China for a long time. The processing of *Dendrobium officinale* is mainly to extract its main active ingredient-water-soluble dendrobium polysaccharides, but some studies have shown that *Dendrobium officinale* contains some polysaccharides dissolved in saline solution, which also have the efficacy of anti-oxidation and anti-tumor. Because people neglect these saline-soluble polysaccharides, these resources are not fully utilized and the processing cost is increased. As a low-cost physical purification method, the membrane separation technology does not introduce impurities and operates under mild conditions, which can effectively reduce the influence of processing on active ingredients. However, the ultrafiltration extraction only allows molecules smaller than the pore diameter of ultrafiltration membrane to pass, while some polysaccharides have increased molecular weights due to intermolecular complexation with metal ions, therefore, this part of dendrobium polysaccharides will be wasted during processing by the traditional ultrafiltration extraction; in addition, the traditional ultrafiltration technology has not solved the problem of extracting *Dendrobium officinale* polysaccharides dissolved in the saline solution.

In addition, the contamination of soil and water usually leads to the enrichment of some heavy metals in the plants and these heavy metals are prone to accumulate in the human body for a long time. As polysaccharides have good adsorption of metal ions, the heavy metal ions in polysaccharides may exceed the standards, which will seriously affect the quality of polysaccharides and human health. However, the existing polysaccharide extraction technologies have not solved the problems of excessive heavy metals. At present, the commonly used heavy metal ion removal technology is mostly used for wastewater treatment (such as precipitation method or adsorption method). These methods can reduce the content of some heavy metal ions to a certain extent, but it is difficult to remove metal ions complexed with polysaccharides, moreover, it is prone to produce waste residues, causing environmental pollution and waste of resources.

Chinese patent CN102532332A discloses a method for preparing fucoidin. The method uses brown algae as raw material to produce crude *Panax notoginseng* polysaccharides by filtration and ethanol precipitation, and purify the polysaccharides by the ultrafiltration technology, and perform desalting of the polysaccharide solution by the electrodialysis method. However, the content of fucoidin prepared by this method is low, only about 35%, and the purity of the final product (i.e. polysaccharide) is not clearly described in the patent. The published patent CN106317243A discloses a method for preparing lycium barbarum polysaccharides. According to the method, lycium barbarum polysaccharides is extracted by ultrafiltration and reverse osmosis concentration, and desalting is performed by an electrodialysis method, and then four-stage ultrafiltration and electrodialysis with different membrane pore sizes are carried out to obtain polysaccharides with a desalination rate of 92% and a purity of 65%. Through this method, the extracted polysaccharides have high yield but low purity; but its operations are complicated. In addition, the patent proposes the contents of trace elements of lycium barbarum polysaccharide (heavy metal ion Pb should be less than 0.5 mg/Kg and As should be less than 0.3 mg/Kg), but it does not indicate the contents of heavy metal ions in the lycium barbarum polysaccharide prepared by this method.

U.S. Pat. No. 8,097,086 discloses a method for producing syrup with high fructose content. According to the method, the sorbitol and salt ions in the syrup are partially removed by ultrafiltration and electrodialysis, with certain advantages. However, the method only adopts the combined two separation processed to purify and the extraction step is relatively complex; moreover, the patent has not solved the problems of recycling alcohols and phenols removed by ultrafiltration. U.S. Pat. No. 6,372,049 discloses a method for preparing refined syrup by electrochemical treatment, ultrafiltration, electrodialysis and ion exchange techniques. This method performs low-efficiency ultrafiltration through the diffusion capacity of high-molecular components and salts, which will cause serious contamination of ultrafiltration membranes and serious waste of resources.

In order to reduce these problems when extracting and purifying *Dendrobium officinale* polysaccharides, it is necessary to further optimize and improve the purification process of natural polysaccharides.

SUMMARY OF THE INVENTION

To solve the existing problems, the present invention provides a method for extracting and purifying *Dendrobium officinale* polysaccharides, which is easy to operate, environmentally friendly and safe, efficient and economical, and suitable for industrial production. The method can solve the problem of enrichment of toxic heavy metals while improving the extraction rate of *Dendrobium officinale* polysaccharides.

The present invention adopts the following technical solutions.

A method for extracting and purifying *Dendrobium officinale* polysaccharides, comprising following steps:

(1) taking *Dendrobium officinale* powder and fully dispersing it in pure water to obtain crude liquid;

(2) removing insoluble impurities from the crude liquid obtained in the step (1) through a microfiltration membrane to obtain permeate 1 and retentate 1;

(3) performing ultrafiltration treatment of the permeate 1 collected in the step (2) through a macroporous ultrafiltration membrane with a molecular weight cut-off (MWCO) of 100-800 kDa, and collecting permeate 2 and retentate 2;

(4) adding 0.5-1.5 mol/L of aqueous solution of edible alkali metal inorganic salt to the retentate 2 collected in the step (3), fully stirring and dissolving to obtain polysaccharide crude liquid (the polysaccharide crude liquid contains amino acids, polyphenols and some proteins), performing ultrafiltration treatment through a macroporous ultrafiltration membrane with a MWCO of 100-800 kDa, and collecting permeate 3 and retentate 3;

(5) combining the permeate 2 and permeate 3 obtained in the step (3) and step (4), adding the combined permeate into an electrodialysis device for desalination, and collecting dilute solution and concentrated solution;

(6) performing ultrafiltration treatment of the dilute solution obtained in the step (5) through an ultrafiltration membrane with a MWCO of 3 kDa-8 kDa and collecting retentate 4 and permeate 4; this step can remove the substances such as oligosaccharides, monosaccharides, polyphenols, flavonoids in the dilute solution;

(7) carrying out freeze-drying of the retentate 4 obtained in the step (6) to obtain *Dendrobium officinale* polysaccharides.

In the foregoing step (1) herein, the concentration of the crude liquid is preferably 10-30 wt %.

In the foregoing step (2) herein, preferred microfiltration membrane treatment conditions are as follows: operating temperature is 25-50° C., transmembrane pressure is 0.3-0.6 MPa, feed liquid flow rate is 0.2-0.5 L/min. Based on the design of the existing microfiltration membrane device, each microfiltration inevitably produces a certain volume of retentate that will not enter the subsequent processing steps, and it will cause waste of *Dendrobium officinale* polysaccharides. Therefore, preferably, the obtained retentate 1 is diluted with pure water, then pass through the microfiltration membrane for treatment, the treatment with the microfiltration membrane is repeated two or more times and then the permeate 1 is combined. By this operation, it minimizes the residual amount of *Dendrobium officinale* polysaccharides in the retentate, which is conducive to enhancing the extraction rate of polysaccharides. However, in consideration of the economic efficiency, it is preferable that the treatment with microfiltration membrane is repeated 2 to 6 times, most preferably 5 times. When the retentate 1 is diluted with pure water, volume ratio of the retentate 1 to pure water for dilution is preferably 3:8-12.

In the foregoing step (3) herein, the MWCO of the ultrafiltration membrane will affect the extraction rate and mass of polysaccharides. Preferably, the MWCO of the macroporous ultrafiltration membrane is 300-800 kDa, and most preferably 500 kDa, such that a higher polysaccharide extraction rate, a higher purity of polysaccharides and a lower heavy metal content can be obtained. Preferably, in the step (3), ultrafiltration treatment conditions are as follows: operating temperature is 25-50° C., transmembrane pressure is 0.3-0.6 MPa, feed liquid flow rate is 0.2-0.5 L/min. Based on the design of the existing ultrafiltration membrane device, each ultrafiltration inevitably produces a certain volume of retentate that will not enter the subsequent processing steps, and it will cause waste of *Dendrobium officinale* polysaccharides. Therefore, preferably, the retentate 2 obtained in the step (3) is diluted with pure water, then repeat the treatment through the ultrafiltration membrane, and the ultrafiltration treatment is repeated 2 to 5 times, to minimize the residual amount of *Dendrobium officinale* polysaccharides in retentate 2 and enhance the polysaccharide extraction rate. When the retentate 2 is diluted with pure water, the volume ratio of retentate 2 to pure water for dilution is preferably 3:8-12. However, even so, after ultrafiltration treatment in the step (3), some polysaccharides have not been extracted, including some polysaccharides that are insoluble in water but dissolved in saline solution and have antioxidant and anti-tumor effects; and some polysaccharides that cannot pass through the ultrafiltration membrane after the molecular weights increase due to the intermolecular complexation with metal ions. In order to enhance the polysaccharide extraction rate, the retentate 2 is subjected to the treatment in the step (4) after the ultrafiltration treatment.

In the foregoing step (4) herein, the added edible alkali metal inorganic salt is preferably one of NaCl, $Na_2SO_4$, KCl, $K_2SO_4$ or a mixture thereof, and it is particularly preferred that the aqueous solution of the edible alkali metal inorganic salt is 0.5-1.5 M NaCl aqueous solution or 0.5-1M $Na_2SO_4$ aqueous solution, most preferably 0.5M NaCl aqueous solution or $Na_2SO_4$ aqueous solution. The retentate 2 is subjected to ultrafiltration treatment after diluted with an aqueous solution of edible alkali metal inorganic salt, which can increase the extraction rate of polysaccharides and reduce the polysaccharide blockage caused by the formation of a contaminated layer on the membrane surface during subsequent membrane treatment, because if the concentration of feed liquid is too high, it is prone to form concentration polarization phenomenon on the membrane surface. The addition of a certain concentration of edible alkali metal inorganic salt into the retentate can facilitate further extraction of polysaccharides soluble in saline solution and increase the extraction rate of polysaccharides; in addition, the edible alkali metal inorganic salt will reduce the binding force of divalent or high-valent harmful metal ion (such as copper, arsenic, lead, mercury, cadmium ions) with polysaccharides, so that part of divalent or high-valent metal ions complexed with polysaccharides are converted into free state, and the molecular weights of the polysaccharides originally complexed with the divalent or high-valent harmful metal ions are reduced to easily pass through the ultrafiltration membrane. Therefore, in the step (4), by adding a certain concentration of edible inorganic salt, more divalent or high-valent harmful metal ions are converted into a free state to facilitate subsequent removal through electrodialysis and more polysaccharides can enter the permeate 3 through subsequent ultrafiltration treatment, thus improving the polysaccharide extraction rate. Similar to the step (3), in the step (4), the MWCO of the macroporous ultrafiltration membrane is preferably 300-800 kDa, and most preferably 500 kDa. Preferably, in the step (4), ultrafiltration treatment conditions are as follows: pH of feed liquid is 4-10 (more preferably 6-7), operating temperature is 25-50° C. (more preferably 30-35° C.), transmembrane pressure is 0.3-0.6 MPa, and flow rate of the feed liquid is 0.2-0.5 L/min. The pH of the feed liquid can be adjusted by adding hydrochloric acid or sodium hydroxide. Similarly, based on the design of the ultrafiltration membrane device, it is preferable to dilute the retentate 3 obtained in the step (4) with the aqueous solution of the edible alkali metal inorganic salt, then repeat the treatment with the macroporous ultrafiltration membrane, and the ultrafiltration treatment is repeated 2 to 5 times, to minimize the residual amount of *Dendrobium officinale* polysaccharides in retentate 3 and enhance the polysaccharide extraction rate. When the retentate 2 or 3 is diluted with the aqueous solution of the edible alkali metal inorganic salt, volume ratio of the retentate 2 or 3 to the aqueous solution of the edible alkali metal inorganic salt is preferably 3:8-11, and most preferably 3:10.

In the foregoing step (5) herein, the permeate 2 and permeate 3 are combined for the following electrodialysis treatment. Since the charged particles in the solution move across the membrane under the action of electric field force during the electrodialysis, the monovalent ions and divalent or high-valent ions have competitive transmission and adding edible inorganic salt ions facilitate the separation of divalent or high-valent heavy metal ions. Therefore, through the electrodialysis in this step, the divalent or high-valent heavy metal ions in the feed liquid and the subsequently added inorganic salts (for example, NaCl, $Na_2SO_4$, etc.) can be effectively removed.

In the foregoing step (5) herein, the electrodialysis device comprises a DC power supply, an anode plate connected to the positive pole of the power source, a cathode plate connected to the negative pole of the DC power source, and a membrane stack disposed between the anode plate and the cathode plate. An anode chamber and a cathode chamber are constituted respectively between the membrane stack and the anode plate, and between the membrane stack and cathode plate. The membrane stack is composed of cation exchange membranes and anion exchange membranes, which are sequentially arranged and assembled at intervals, and both of the outermost membranes are cation exchange membranes. Two adjacent membranes are separated by a spacer. One group of adjacent cation exchange membrane, anion exchange membrane, and cation exchange membrane forms a two-chamber electrodialysis unit (concentrated chamber/dilute chamber), and there are at least one electrodialysis unit in the membrane stack; The anode chamber and the cathode chamber are respectively connected to the electrode liquid tank through pipes to form a loop (that is, a circulating pump can be used to flow the electrode liquid in the electrode liquid tank into the anode chamber and cathode chamber, and then the feed liquid in the anode chamber and cathode chamber flows back to the electrode liquid tank), the dilute chamber and the concentrated chamber are respectively connected to the dilute liquid tank and the concentrated liquid tank through pipes to form respective loops. For the present invention, before electrodialysis, the electrode liquid (preferably 3 wt. % sodium sulfate solution), the mixture of permeate 2 and permeate 3, pure water are injected into the electrode liquid tank, dilute liquid tank, concentrated liquid tank, respectively. A person skilled in the art can select the membranes according to the actual situations and set appropriate electrodialysis operating conditions. In general, the selection of the membranes of the electrodialysis device is based on the resistance and current efficiency of the membrane stack; it is appropriate to select a membrane stack with a lower resistance and a higher current efficiency, which has a low process cost. Electrodialysis conditions are determined based on the nature of the feed liquid and the membrane resistance, and voltage and current are selected within the limiting current density. For the present invention, there is no special requirement for the selection of cation exchange membrane and anion exchange membrane, and the conventional commercially available cation exchange membrane and anion exchange membrane can be selected according to the actual situation. In the present invention, there are no special requirements for the electrodialysis conditions. For example, the operating conditions of electrodialysis can be set as follows: room temperature, voltage is 5-30 V, flow rate of feed liquid is 10-40 L/h. The electrodialysis procedure is generally stopped when the conductivity tends to a stable value, usually it lasts no more than 1h, and the conductivity does not exceed 2 mS/cm to ensure that the added salt is removed.

In the foregoing step (6) herein, the MWCO of the ultrafiltration membrane is preferably 3-5 kDa, more preferably 5 kDa, which can better remove oligosaccharides, monosaccharides, polyphenols, flavonoids, etc. Preferably, in the step (6), ultrafiltration treatment conditions are as follows: temperature is 25-50° C., transmembrane pressure is 0.3-0.6 MPa, flow rate of feed liquid is 0.2-0.5 L/min. Furthermore, in order to remove the substances such as oligosaccharides, monosaccharides, polyphenols, flavonoids, etc., it is preferable to dilute the obtained retentate 4 with pure water and then perform the ultrafiltration membrane treatment again. The treatments with the ultrafiltration membrane are carried out two or more times, but in consideration of economy, preferably, the treatment with the ultrafiltration membrane is carried out 2 to 6 times, most preferably 3 times. When the retentate 4 is diluted with pure water, the volume ratio of the retentate 4 to the pure water for dilution is preferably 3:8-12.

In the foregoing step (7) herein, the retentate 4 may be concentrated before being freeze-dried. There are no special requirements for the concentration method, for example, the methods such as nanofiltration, rotary evaporation, etc. can be used to achieve the purpose of concentration; however, in consideration of the requirements of industrial production, the concentration by nanofiltration is preferably adopted. In the present invention, there are no special requirements for nanofiltration membranes and operating parameters used in the concentration method by nanofiltration as long as it can achieve the purpose of concentration. For example, in a specific embodiment of the present invention, the nanofiltration membranes with a MWCO of 3 kDa-83 kDa are used, and the operations are carried out under conditions of room temperature, transmembrane pressure of 0.3-0.6 MPa and feed liquid flow rate of 0.2-0.5 L/min.

Advantages and Beneficial Effects (1) According to the extraction and purification method of *Dendrobium officinale* polysaccharides provided in the present invention, after water-soluble polysaccharides in *Dendrobium officinale* are extracted by ultrafiltration technology, a certain concentration of inorganic salt is added to the retentate to continue the extraction and the electrodialysis is carried out, to enhance the yield of polysaccharides and effectively remove the heavy metal ions in the polysaccharides. The polysaccharides prepared by the method provided in the present invention have the characteristics of high purity and low heavy metal content.

(2) In the present invention, the method of preparing *Dendrobium officinale* polysaccharides based on ultrafiltration and electrodialysis technologies has the advantages of environmental protection, safety, high efficiency, continuous operation and low cost, etc., therefore, it is suitable for industrial production.

DETAILED DESCRIPTION OF THE EMBODIMENTS

The technical solutions of the present invention are further described below with specific embodiments, but the scope of protection of the present invention is not limited thereto.

Example 1

① 200 g of *Dendrobium officinale* powder was fully dissolve in 1000 mL of pure water to obtain crude liquid of *Dendrobium officinale*;

② Insoluble impurities were removed from the *Dendrobium officinale* crude liquid through a microfiltration membrane with a pore size of 0.1 μm (microfiltration conditions: temperature of 25° C., transmembrane pressure of 0.3 MPa and solution flow rate of 0.4 L/min). The microfiltration was carried out five times in total. The retentate after each microfiltration was diluted with 1000 mL of pure water for the next microfiltration. The permeate of five times of microfiltration was combined to get a total of 5000 mL;

③ 5000 mL of the permeate obtained in the step ② was subjected to dead-end ultrafiltration through a 500 kDa ultrafiltration membrane to extract polysaccharides (ultrafiltration conditions: temperature of 25° C., transmembrane pressure of 0.3 MPa, solution flow rate of 0.4 L/min), the obtained retentate was added with 1000 mL of pure water for the next ultrafiltration, the ultrafiltration was repeated for 3 times, and 300 mL of retentate and 7700 mL of permeate were collected;

④ 300 mL of the retentate collected through the ultrafiltration membrane was added into 1000 mL of 0.5 mol/L NaCl aqueous solution (mixed solution at pH 7), fully stirred and then subjected to dead-end ultrafiltration through a 500 kDa ultrafiltration membrane, the obtained retentate was added with 1000 mL of the above saline solution for the next ultrafiltration, the ultrafiltration was repeated for 3 times, and the retentate and permeate were collected.

Figure 1:
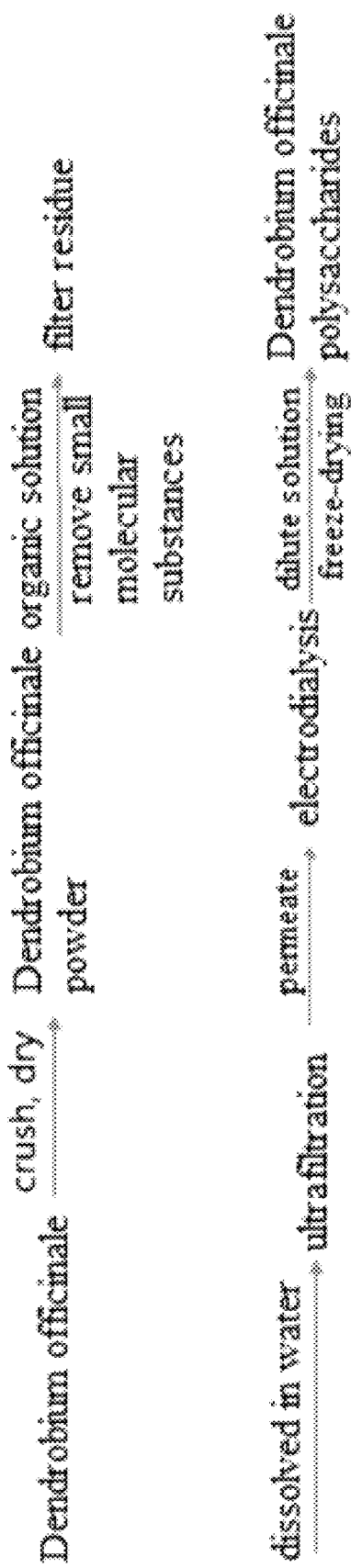
FIG. 1 is a conventional process route for preparing dendrobium polysaccharides.
Figure 2:
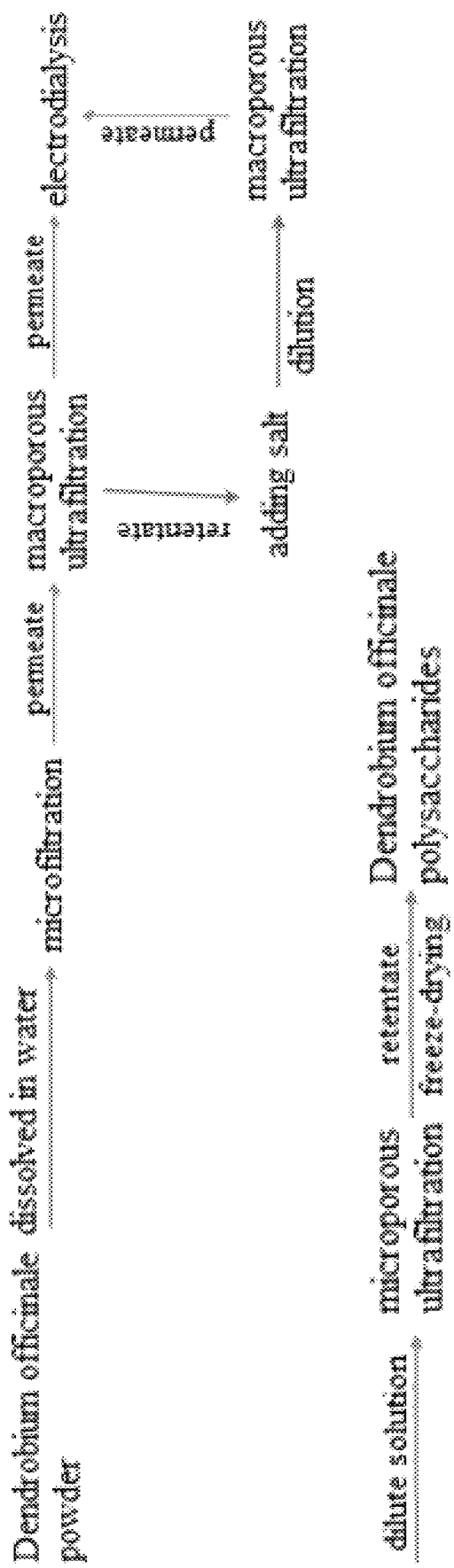
FIG. 2 is a process route for preparing dendrobium polysaccharides adopted in the present invention.
Figure 3:
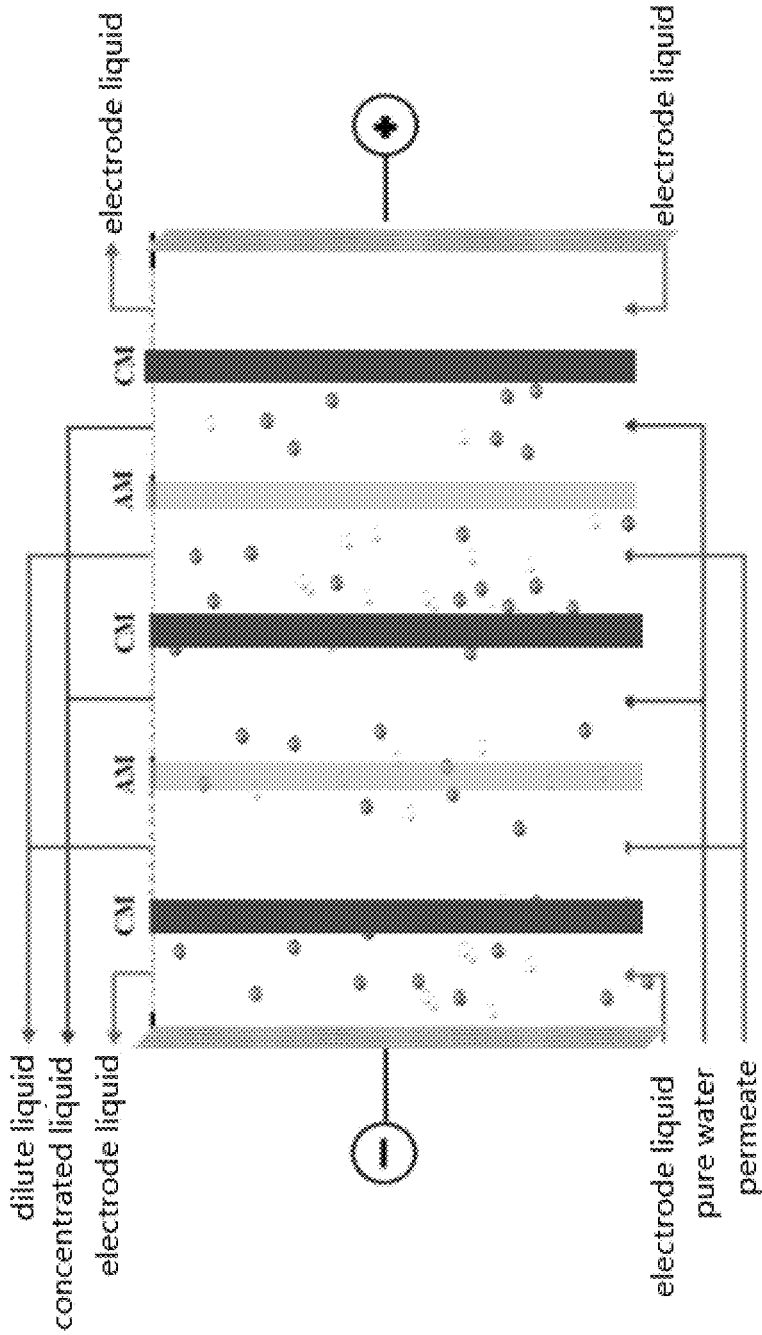
FIG. 3 is a schematic diagram of the electrodialysis device used in the embodiments of the present invention, in which the dilute liquid tank, concentrated liquid tank, electrode liquid tank, circulating pump, etc. are not shown.
Figure 4:
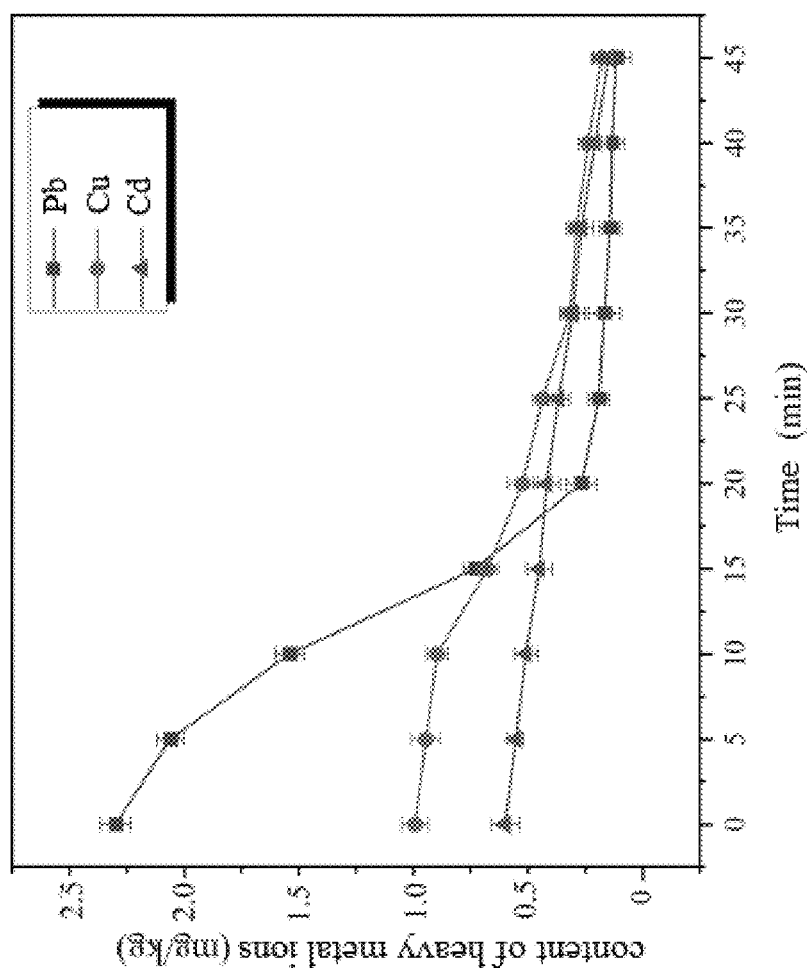
FIG. 4 is a curve showing the change in the metal ion content in the extract over time during the electrodialysis process of Example 1.
Figure 5:
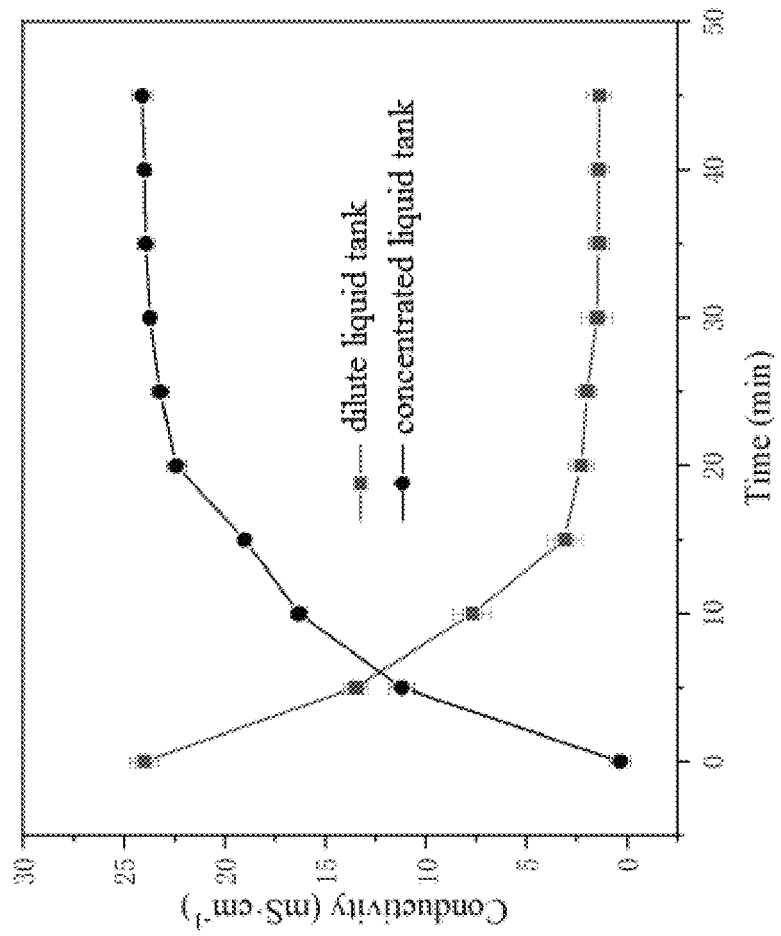
FIG. 5 is a curve showing the change in the conductivity of the liquid in the concentrated chamber and dilute chamber over time during the electrodialysis process of Example 1.

⑤ The permeate obtained in step ④ and step ③ was combined. The obtained permeate contained polysaccharides, oligosaccharides, monosaccharides, heavy metal salts and added sodium chloride. The permeate was added to the dilute liquid tank of the electrodialysis device, pure water was added to the concentrated liquid tank, and 3% anhydrous sodium sulfate aqueous solution was added to the electrode liquid tank (the schematic diagram of the device is shown in FIG. 3). The membrane stack of the electrodialysis device was composed of 5 electrodialysis units. The cation exchange membranes with model TRJCM were purchased from Beijing Tingrun Membrane Technology Development Co., Ltd., and the anion exchange membranes with model TRJAM were purchased from Beijing Tingrun Membrane Technology Development Co., Ltd., with an effective membrane area of $6.4\times10^{-3}$ m². Both the anode and the cathode were electrodes coated with ruthenium. The circulating pump was started to make the feed liquid start circulating and the device was powered on for electrodialysis. The operating conditions were: voltage of 20V, and feed liquid flow rate of 40 L/h. When the conductivity tended to stable, stopped the operation and the operation lasted 45 min, and collected the dilute solution. In the process of electrodialysis, took the samples of dilute solution for freeze-drying every 5 minutes, and determined the content of heavy metals in the freeze-dried samples by ICP-MS. The results were shown in FIG. 4. In the process of electrodialysis, took the samples of dilute solution and concentrated solution every 5 min to determine the conductivity. The results were shown in FIG. 5. At the same time, after measurement, the concentration of NaCl in the dilute solution after electrodialysis was 24.3 mg/L, which was far lower than the sodium salt content in the human blood.

⑥ The dilute solution obtained in the step ⑤ was subjected to ultrafiltration treatment through an ultrafiltration membrane with a MWCO of 5 kDa (ultrafiltration condition: temperature 25° C., transmembrane pressure 0.3 MPa, solution flow rate 0.4 L/min), and the ultrafiltration treatment was carried out for 3 times to remove the substances such as oligosaccharides, monosaccharides, polyphenols, flavonoids, etc. The retentate of each ultrafiltration was diluted with 1000 mL of pure water before the next ultrafiltration.

⑦ Freeze-drying of the retentate obtained in the step ⑥ was carried out with a freeze dryer to obtain 83.9 g of *Dendrobium officinale* polysaccharides product (DOPs) with a content of heavy metal ions (lead content+copper content+cadmium content) of 0.296 mg·Kg$^{-1}$ and a purity of polysaccharides of 87.13%. The lead content in the polysaccharides was decreased from 2.260 mg/Kg before electrodialysis to 0.031 mg/Kg, the copper content was decreased from 0.857 mg/Kg to 0.063 mg/kg, and the cadmium content was decreased from 0.491 mg/Kg to 0.202 mg/Kg.

Test methods were as follows:

1. Determination of Polysaccharide Content

The polysaccharide content is the total carbohydrate in DOPs aqueous solution (obtained by dissolving the DOPs in water) minus the reducing sugar content.

The total carbohydrate content was determined according to the phenol-sulfuric acid method and some modifications were made (Xie, J. H., Shen, M. Y., Nie, S. P., Zhao, Q., Li, C., Xie, M. Y., 2014. Separation of water-soluble polysaccharides from *Cyclocarya paliurus* by ultrafiltration process. Carbohydr Polym 101, 479-483). Approximately 2 mL of the DOPs aqueous solution was placed in a test tube. After adding 5% (w/w) phenol (1 mL) and H$_2$SO$_4$ (5 mL), the mixture was kept in a boiling water bath for 15 minutes and then cooled under a water stream. Absorbance was measured at 490 nm using a UV-visible spectrophotometer.

The reducing sugar measurement was carried out according to the literature method (Zhu, J., Chen, Z., Chen, L., Yu, C., Wang, H., Wei, X., Wang, Y., 2019. Comparison and structural characterization of polysaccharides from natural and artificial Se-enriched green tea. Int J Biol Macromol 130, 388-398) and some modifications were made. Approximately 1 mL or more of the DOPs aqueous solution was absorbed into the tubes and mixed with 3 mL of DNS. The solution was kept in a boiling water bath for 5 minutes and then cooled under a stream of water. The solution was thoroughly mixed and its absorbance was measured at 540 nm in a UV-visible spectrophotometer.

2. Polysaccharide Purity

The purity of polysaccharides (P) is the ratio of mass ($W_{retentate}$) of polysaccharides in the DOPs aqueous solution to mass of DOPs ($W_{feed}$). The definition is as follows:

$$p\% = \frac{W_{retentate}}{W_{feed}} \times 100\%$$

3. Heavy Metal Content Determination

The content of lead, copper, and chromium in DOPs was determined by inductively coupled plasma mass spectrometry (ICP-MS).

Comparative Example 1

The steps ① and ② were the same as those in Example 1;

③ 5000 mL of the permeate obtained in five times of microfiltration was subjected to dead-end ultrafiltration through a 500 kDa PES flat membrane to extract polysaccharides (ultrafiltration conditions: temperature of 25° C., transmembrane pressure of 0.3 MPa, solution flow rate of 0.4 L/min), the obtained retentate was added with 1000 mL of pure water for the next ultrafiltration treatment, the ultrafiltration treatment was repeated for 6 times, and the permeate was collected and combined.

④ The permeate collected through the ultrafiltration membrane was added into a dilute liquid tank of the electrodialysis device (the electrodialysis device was the same as that in Example 1). The membrane stack of the electrodialysis device was composed of 5 electrodialysis units. The cation exchange membranes with model TRJCM were purchased from Beijing Tingrun Membrane Technology Development Co., Ltd., and the anion exchange membranes with model TRJAM were purchased from Beijing Tingrun Membrane Technology Development Co., Ltd., with an effective membrane area of $6.4\times10^{-3}$ m$^2$. Both the anode and the cathode were electrodes coated with ruthenium. Electrode liquid tank: 3% anhydrous sodium sulfate aqueous solution, concentrated liquid tank: pure water. The circulating pump was started to make the feed liquid start circulating and the device was powered on for electrodialysis. Operating conditions were as follows: voltage of 20V, feed liquid flow rate of 40 L/h. Stopped the operation when the conductivity tended to stable. The operation lasted 15 min, and the dilute solution was collected.

⑤ The obtained dilute solution was subjected to ultrafiltration treatment through a 5 kDa PES flat membrane and the ultrafiltration treatment was carried out for three times (ultrafiltration condition: temperature 25° C., transmembrane pressure 0.3 MPa, solution flow rate 0.4 L/min) to remove the substances such as oligosaccharides, monosaccharides, polyphenols, flavonoids, etc. The retentate of each ultrafiltration was diluted with 1000 mL of pure water for the next ultrafiltration. The retentate and permeate were collected.

⑥ Freeze-drying of the retentate obtained in the step ⑤ was carried out with a freeze dryer to obtain 78.12 g of *Dendrobium officinale* polysaccharides with a content of heavy metal ions of 0.510 mg·Kg$^{-1}$ and a purity of polysaccharide of 78.11%. The lead content was 0.113 mg/Kg, the copper content was 0.170 mg/kg and the cadmium content was 0.227 mg/Kg in the polysaccharides.

Examples 2-4

The concentration of the NaCl aqueous solution in step ④ was changed to 1 mol/L (Example 2), 1.5 mol/L (Example 3), 2 mol/L (Example 4). Other procedures were the same as those in Example 1. The mass, purity and heavy metal content of obtained *Dendrobium officinale* polysaccharides were shown in the following table 1.

TABLE 1

| | Comparative Example 1 | Example 1 | Example 2 | Example 3 | Example 4 |
|---|---|---|---|---|---|
| $^a$NaCl concentration/M | 0 | 0.5 | 1 | 1.5 | 2 |
| Mass of polysaccharides/g | 78.12 | 83.9 | 81.21 | 82.13 | 79.1 |
| Purity of polysaccharides/% | 78.11 | 87.13 | 79.23 | 78.7 | 75.0 |
| Content of heavy metal ions/mg · Kg$^{-1}$ | 0.510 | 0.296 | 0.291 | 0.311 | 0.316 |
| Lead content/ mg · Kg$^{-1}$ | 0.113 | 0.031 | 0.028 | 0.032 | 0.029 |
| Copper content/ mg · Kg$^{-1}$ | 0.170 | 0.063 | 0.055 | 0.049 | 0.058 |
| Cadmium content/ mg · Kg$^{-1}$ | 0.227 | 0.202 | 0.208 | 0.23 | 0.229 |
| $^b$NaCl concentration/mg/L | — | 24.3 | 27.2 | 25.4 | 28.1 |

$^a$The concentration of the sodium chloride aqueous solution added in step ④
$^b$The concentration of NaCl in the dilute solution after the electrodialysis was completed.

Example 5

The steps ① to ③ were the same as those in Example 1;

④ 300 mL of the retentate collected through ultrafiltration membrane was added into 1000 mL of 0.5 mol/L Na$_2$SO$_4$ aqueous solution, fully stirred and subjected to dead-end ultrafiltration through a 500 kDa ultrafiltration membrane, the resulting retentate was added to 1000 mL of the above saline solution for the next ultrafiltration treatment, the ultrafiltration treatment was repeated for 3 times, and the retentate and permeate were collected.

⑤ The permeate obtained in step ④ and step ③ was combined, and the obtained permeate contained polysaccharides, oligosaccharides, monosaccharides, heavy metal salts and added sodium chloride. The solution was added to the dilute liquid tank of the electrodialysis device (see FIG. 3 for a schematic diagram of the device), pure water was added to the concentrated liquid tank, and 3% sodium sulfate aqueous solution was added to the electrode liquid tank. The membrane stack of the electrodialysis device was composed of 5 electrodialysis units. The CEM-Type II cation exchange membranes and AEM-Type II anion exchange membranes were used, both of which were purchased from Fujifilm Corporation of Japan. The effective membrane area of each membrane was $6.4\times10^{-3}$ m$^2$. Both the anode and the cathode were electrodes coated with ruthenium. The circulating pump was started to make the feed liquid start circulating and the device was powered on for electrodialysis. Operating conditions were as follows: voltage of 20V, feed liquid flow rate of 40 L/h. The operation lasted 45 min, and the dilute solution was collected.

⑥ The dilute solution obtained in the step ⑤ was subjected to ultrafiltration treatment through an ultrafiltration membrane with a MWCO of 5 kDa (ultrafiltration condition: temperature 25° C., transmembrane pressure 0.3 MPa, solution flow rate 0.4 L/min) and the ultrafiltration treatment was carried out for 3 times to remove the substances such as oligosaccharides, monosaccharides, polyphenols, flavonoids, etc. The retentate of each ultrafiltration was diluted with 1000 mL of pure water for the next ultrafiltration.

⑦ Freeze-drying of the retentate obtained in the step ⑥ was carried out with a freeze dryer to obtain 82.4 g of *Dendrobium officinale* polysaccharides with a content of heavy metal ions of 0.219 mg·Kg$^{-1}$ and a purity of polysaccharide of 87.13%. The lead content was 0.028 mg/Kg, the copper content was 0.068 mg/kg and the cadmium content was 0.132 mg/Kg in the polysaccharides.

Example 6

In step ④, 1000 mL of 1 mol/L Na$_2$SO$_4$ aqueous solution was added, and the other procedures were the same as Example 5, finally 76.7 g of *Dendrobium officinale* polysaccharides with a content of heavy metal ions of 0.241 mg·Kg$^{-1}$ and a purity of polysaccharide of 81.6% was obtained. The lead content was 0.036 mg/Kg, the copper content was 0.077 mg/kg and the cadmium content was 0.128 mg/Kg in the polysaccharides.

Examples 7-11

In the step ④, the ultrafiltration operating temperature was changed to 30° C. (Example 7), 35° C. (Example 8), 40° C. (Example 9), 45° C. (Example 10), 50° C. (Example 11), respectively, other procedures were the same as those in Example 1. The mass, purity and content of heavy metals of the obtained *Dendrobium officinale* polysaccharides were shown in the following Table 2.

TABLE 2

| | Example 1 | Example 7 | Example 8 | Example 9 | Example 10 | Example 11 |
|---|---|---|---|---|---|---|
| T/° C. | 25 | 30 | 35 | 40 | 45 | 50 |
| Mass of polysaccharides/g | 83.9 | 89.3 | 92.4 | 90.3 | 87.5 | 85.3 |
| Purity of polysaccharides/% | 87.13 | 90.1 | 88.6 | 85.3 | 83.9 | 81.0 |
| Content of heavy metal ions/mg · Kg$^{-1}$ | 0.296 | 0.303 | 0.34 | 0.302 | 0.298 | 0.32 |

Examples 12-17

In the step ④, the pH value of the ultrafiltration feed liquid was adjusted to 4 (Example 12), 5 (Example 13), 6 (Example 14), 8 (Example 15), 9 (Example 16), 10 (Example 17) using hydrochloric acid or NaOH, respectively, and the other procedures were the same as those in Example 1. The mass, purity and content of heavy metals of the obtained *Dendrobium officinale* polysaccharides were shown in the following Table 3.

TABLE 3

| | pH | Mass of polysaccharides/g | Purity of polysaccharides/% | Content of heavy metals/mg · Kg$^{-1}$ |
|---|---|---|---|---|
| Example 12 | 4 | 78.6 | 79.6 | 0.314 |
| Example 13 | 5 | 82.11 | 86.9 | 0.303 |
| Example 14 | 6 | 84.1 | 88.3 | 0.299 |
| Example 1 | 7 | 83.9 | 87.13 | 0.296 |
| Example 15 | 8 | 82.6 | 80.9 | 0.45 |
| Example 16 | 9 | 81.9 | 74.7 | 0.498 |
| Example 17 | 10 | 74.6 | 64.3 | 0.78 |

Examples 18-19

In the steps ③ and ④, the MWCO of ultrafiltration membrane was changed to 300 kDa (Example 18) or 800 kDa (Example 19), and the other procedures were the same as those in Example 1. The mass, purity and content of heavy metals of the obtained *Dendrobium officinale* polysaccharides were shown in the following Table 4.

TABLE 4

| | Example 1 | Example 18 | Example 19 |
|---|---|---|---|
| MWCO/kDa | 500 | 300 | 800 |
| Mass of polysaccharides/g | 83.9 | 78.4 | 96.8 |
| Purity of polysaccharides/% | 87.13 | 90.5 | 73.5 |
| Content of heavy metal ions/mg · Kg$^{-1}$ | 0.296 | 0.363 | 0.387 |

Examples 20-21

In the step ⑥, the MWCO of ultrafiltration membrane was changed to 3 kDa (Example 20) or 8 kDa (Example 21), and the other procedures were the same as those in Example 1. The mass, purity and content of heavy metals of the obtained *Dendrobium officinale* polysaccharides were shown in the following Table 5.

TABLE 5

| | Example 1 | Example 20 | Example 21 |
|---|---|---|---|
| MWCO/kDa | 5 | 3 | 8 |
| Mass of polysaccharides/g | 83.9 | 86.7 | 60.9 |
| Purity of polysaccharides/% | 87.13 | 85.9 | 88.6 |
| Content of heavy metal ions/mg · Kg$^{-1}$ | 0.296 | 0.298 | 0.309 |

The invention claimed is:

1. A method for extracting and purifying *Dendrobium officinale* polysaccharides, comprising following steps:
    (1) taking *Dendrobium officinale* powder and fully dispersing it in pure water to obtain crude liquid;
    (2) removing insoluble impurities from the crude liquid obtained in the step (1) through a microfiltration membrane to obtain permeate 1 and retentate 1;
    (3) performing ultrafiltration treatment of the permeate 1 collected in the step (2) through a macroporous ultrafiltration membrane with a molecular weight cut-off of 100-800 kDa, and collecting permeate 2 and retentate 2;
    (4) adding 0.5-1.5 mol/L of aqueous solution of edible alkali metal inorganic salt to the retentate 2 collected in the step (3), stirring and fully dissolving to obtain polysaccharide crude liquid, performing ultrafiltration treatment through a macroporous ultrafiltration membrane with a molecular weight cut-off of 100-800 kDa, and collecting permeate 3 and retentate 3;

(5) combining the permeate 2 and permeate 3 obtained in the step (3) and step (4), adding the combined permeate into an electrodialysis device for desalination, and collecting dilute solution and concentrated solution;

(6) performing ultrafiltration treatment of the dilute solution obtained in the step (5) through an ultrafiltration membrane with a molecular weight cut-off of 3 kDa-8 kDa and collecting retentate 4 and permeate 4;

(7) carrying out freeze-drying of the retentate 4 obtained in the step (6) to obtain *Dendrobium officinale* polysaccharides.

2. The method for extracting and purifying *Dendrobium officinale* polysaccharides according to claim 1, wherein the concentration of *Dendrobium officinale* in the crude liquid is 10-30 wt %.

3. The method for extracting and purifying *Dendrobium officinale* polysaccharides according to claim 1, wherein conditions of the microfiltration membrane treatment are as follows: operating temperature is 25-50° C., transmembrane pressure is 0.3-0.6 MPa, flow rate of feed liquid is 0.2-0.5 L/min.

4. The method for extracting and purifying *Dendrobium officinale* polysaccharides according to claim 1, wherein in the steps (3) and (4), the molecular weight cut-off of the macroporous ultrafiltration membrane is 300-800 kDa.

5. The method for extracting and purifying *Dendrobium officinale* polysaccharides according to claim 4, wherein in the steps (3) and (4), the molecular weight cut-off of the macroporous ultrafiltration membrane is 500 kDa.

6. The method for extracting and purifying *Dendrobium officinale* polysaccharides according to claim 1, wherein conditions of the ultrafiltration treatment are as follows: operating temperature is 25-50° C., transmembrane pressure is 0.3-0.6 MPa, flow rate of feed liquid is 0.2-0.5 L/min.

7. The method for extracting and purifying *Dendrobium officinale* polysaccharides according to claim 1, wherein in the step (4), the edible alkali metal inorganic salt is one of NaCl, $Na_2SO_4$, KCl, $K_2SO_4$ or a mixture thereof.

8. The method for extracting and purifying *Dendrobium officinale* polysaccharides according to claim 1, wherein the aqueous solution of the edible alkali metal inorganic salt is 0.5-1.5 M NaCl aqueous solution or 0.5-1M $Na_2SO_4$ aqueous solution.

9. The method for extracting and purifying *Dendrobium officinale* polysaccharides according to claim 8, wherein the aqueous solution of the edible alkali metal inorganic salt is 0.5M NaCl aqueous solution or 0.5M $Na_2SO_4$ aqueous solution.

10. The method for extracting and purifying *Dendrobium officinale* polysaccharides according to claim 1, wherein conditions of the ultrafiltration treatment are as follows: pH of feed liquid is 4-10, operating temperature is 25-50° C., transmembrane pressure is 0.3-0.6 MPa, and flow rate of feed liquid is 0.2-0.5 L/min.

11. The method for extracting and purifying *Dendrobium officinale* polysaccharides according to claim 10, wherein in the step (4), the conditions of the ultrafiltration treatment are as follows: pH of the feed liquid is 6-7, operating temperature is 30-35° C., and flow rate of feed liquid is 0.2-0.5 L/min.

12. The method for extracting and purifying *Dendrobium officinale* polysaccharides according to claim 1, wherein in the step (6), the molecular weight cut-off of the ultrafiltration membrane is 3-5 kDa.

13. The method for extracting and purifying *Dendrobium officinale* polysaccharides according to claim 1, wherein in the step (6), the molecular weight cut-off of the ultrafiltration membrane is 5 kDa.

* * * * *